E. F. PRYOR.
DRILL HOES.
No. 191,714. Patented June 5, 1877.
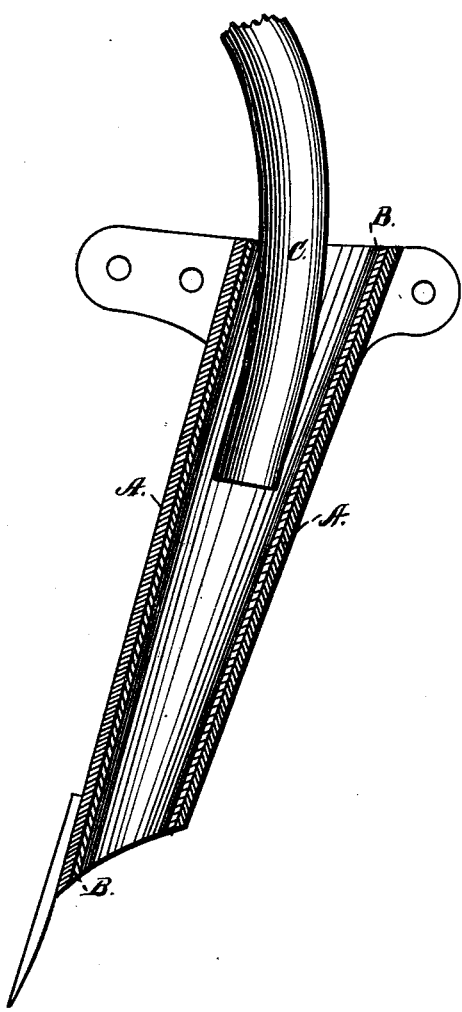

UNITED STATES PATENT OFFICE

EDWARD F. PRYOR, OF DAYTON, OHIO, ASSIGNOR OF ONE-HALF HIS RIGHT TO WM. H. NAUMAN, OF SAME PLACE.

IMPROVEMENT IN DRILL-HOES.

Specification forming part of Letters Patent No. 191,714, dated June 5, 1877; application filed August 30, 1876.

*To all whom it may concern:*

Be it known that I, EDWARD F. PRYOR, of Dayton, in the county of Montgomery and State of Ohio, have invented certain new and useful Improvements in Teeth of Drills and Seed-Planters; and I do hereby declare the following to be a full, clear, and exact description of the same.

This invention relates particularly to that class of grain-drills which employ rubber tubes to convey the seed from the boxes into the hoes; and my improvement consists in coating the inner surface of the hoes with any highly polished smooth enamel to prevent not only the rusting of the hoes, but also the friction between the rubber tubes and the hoes caused by the rising and falling of the latter while at work.

To enable others skilled in the art to which my invention appertains to make and use the same, I would thus proceed to describe it, referring to the accompanying drawing, in which the figure represents a central sectional view, in elevation, of an enameled drill-hoe, with a portion of the conducting-tube applied.

The objections to an ordinary rough-cast drill-hoe are, that it rusts very easily, and at its bottom often becomes clogged with earth, thereby greatly interfering with the proper distribution and flow of the seed; also, in rising and falling with the inequalities of the ground, its interior rough surface wears away, and soon renders worthless the rubber tube which is retained in its top to convey the seed from the distributing-cup to the hoe. When, as is sometimes done, the seed is soaked in alkalies, the rust and wear of the hoe is increased.

All these difficulties are overcome by enameling the inner surface of the hoes. Earth will not adhere to the inside surface near the bottom.

The seed will flow uniformly, and by being perfectly smooth no injury results to the rubber tubes, and they are proof against rust, even where alkalies are used.

Though I have never tried it, yet I believe it would be of advantage to enamel the outside of the hoe where it enters the earth.

In the drawing, A is the hoe; B, the enamel, which is applied in any of the usual ways; and C, the conducting-tube, which may be of rubber or any other material.

It will be seen that I do not limit myself to the particular sort of enamel used, nor to the manner of applying it.

I am aware that an open hoe or conductor has been used on seed-planters whose interior was coated with white enamel, paint, or other substance, to enable the operator walking behind to see that the grain flowed constantly. There was no intention in this, however, of forming a smooth, frictionless surface, and enamel was selected only for its durability. In my hoes the color of the enamel is immaterial, smoothness being the principal requirement.

Having thus fully described my invention, what I claim as new is—

In combination with a conducting-tube of any material, a drill-hoe or tooth whose interior surface is coated with any polished enamel substantially as and for the purpose specified.

Witness my hand this 7th day of August, A. D. 1876.

EDWARD F. PRYOR.

Witnesses:
 WM. RITCHIE,
 W. H. CLARK.